(12) United States Patent
Albrecht

(10) Patent No.: US 7,769,645 B1
(45) Date of Patent: Aug. 3, 2010

(54) TAX RETURN OUTSOURCING AND SYSTEMS FOR PROTECTING DATA

(75) Inventor: Mark R. Albrecht, Hanover, MA (US)

(73) Assignee: XCM Development, LLC, Braintree, MA (US)

( * ) Notice: Subject to any disclaimer, the term of this patent is extended or adjusted under 35 U.S.C. 154(b) by 1794 days.

(21) Appl. No.: 10/609,033

(22) Filed: Jun. 27, 2003

Related U.S. Application Data

(60) Provisional application No. 60/428,998, filed on Nov. 25, 2002.

(51) Int. Cl.
*G06F 17/22* (2006.01)
*G06F 15/16* (2006.01)
*G07F 19/00* (2006.01)

(52) U.S. Cl. .......................... 705/31; 705/30; 709/203; 709/219

(58) Field of Classification Search .................... 705/31
See application file for complete search history.

(56) References Cited

U.S. PATENT DOCUMENTS

| | | | |
|---|---|---|---|
| 5,408,662 | A | 4/1995 | Katsurabayashi |
| 5,515,491 | A | 5/1996 | Bates et al. |
| 5,535,322 | A | 7/1996 | Hecht |
| 5,581,702 | A | 12/1996 | McArdle et al. |
| 5,666,490 | A | 9/1997 | Gillings et al. |
| 5,740,161 | A | 4/1998 | Porter et al. |
| 5,745,687 | A | 4/1998 | Randell |
| 5,781,727 | A | 7/1998 | Carleton et al. |
| 5,799,286 | A | 8/1998 | Morgan et al. |
| 5,819,038 | A | 10/1998 | Carleton et al. |
| 5,850,219 | A | 12/1998 | Kumomura |
| 5,872,924 | A | 2/1999 | Nakayama et al. |
| 5,873,067 | A | 2/1999 | Kobayashi |

(Continued)

FOREIGN PATENT DOCUMENTS

DE 10156532 7/2002

(Continued)

OTHER PUBLICATIONS

Bookkeeper and Controllership Hassle Free Services, Balance Your Books LLC; Retrieved from the Internet at http://www.balanceyourbooks.com/services.shtml.

(Continued)

*Primary Examiner*—F. Ryan Zeender
*Assistant Examiner*—Faris Almatrahi
(74) *Attorney, Agent, or Firm*—Cesari and McKenna LLP

(57) ABSTRACT

A financial services outsourcing method or system facilitates a direct service provider's ability to outsource financial services to numerous ultimate clients. The financial services are outsourced to an outsourcing group abroad. Ultimate client specific financial files and corresponding reference materials are loaded onto a remotely accessible part of a host server located in the United States. The host server provides access to a remote client computer of information concerning the ultimate client specific financial files and corresponding reference materials. The access may be limited to limited screen shot access. Outsourced personnel are retained to perform financial service projects (e.g., prepare individual tax returns) for ultimate clients of direct financial services firms. The outsourced personnel perform the financial service projects while located outside the United States. The status of the financial service project is monitored and reported.

17 Claims, 12 Drawing Sheets

U.S. PATENT DOCUMENTS

| | | | |
|---|---|---|---|
| 5,923,844 A | 7/1999 | Pommier et al. |
| 5,937,388 A | 8/1999 | Davis et al. |
| 5,974,392 A | 10/1999 | Endo |
| 5,996,002 A | 11/1999 | Katsurabayashi et al. |
| 6,006,193 A | 12/1999 | Gibson et al. |
| 6,061,717 A | 5/2000 | Carleton et al. |
| 6,073,109 A | 6/2000 | Flores et al. |
| 6,088,679 A | 7/2000 | Barkley |
| 6,092,048 A | 7/2000 | Nakaoka |
| 6,115,690 A | 9/2000 | Wong |
| 6,144,955 A | 11/2000 | Tsuiki et al. |
| 6,151,583 A | 11/2000 | Ohmura et al. |
| 6,183,140 B1 | 2/2001 | Singer et al. |
| 6,202,052 B1 | 3/2001 | Miller |
| 6,233,600 B1 | 5/2001 | Salas et al. |
| 6,237,025 B1 | 5/2001 | Ludwig et al. |
| 6,246,999 B1 | 6/2001 | Riley et al. |
| 6,286,034 B1 | 9/2001 | Sato et al. |
| 6,314,415 B1 | 11/2001 | Mukherjee |
| 6,314,425 B1 | 11/2001 | Serbinis et al. |
| 6,343,275 B1 | 1/2002 | Wong |
| 6,377,982 B1 | 4/2002 | Rai et al. |
| 6,397,195 B1 | 5/2002 | Pinard et al. |
| 6,401,073 B1 | 6/2002 | Tokuda et al. |
| 6,442,528 B1 | 8/2002 | Notani et al. |
| 6,473,741 B1 * | 10/2002 | Baker ............... 705/31 |
| 6,539,404 B1 | 3/2003 | Ouchi |
| 6,567,789 B1 | 5/2003 | Baker |
| 6,574,674 B1 | 6/2003 | May et al. |
| 7,421,153 B1 * | 9/2008 | Ronca et al. ............ 382/305 |
| 2001/0037268 A1 | 11/2001 | Miller |
| 2001/0051913 A1 | 12/2001 | Vashistha et al. |
| 2001/0054023 A1 | 12/2001 | Murata |
| 2002/0002469 A1 | 1/2002 | Hillstrom |
| 2002/0010665 A1 | 1/2002 | Lefebvre et al. |
| 2002/0013747 A1 | 1/2002 | Valentine et al. |
| 2002/0019741 A1 | 2/2002 | Heston |
| 2002/0022982 A1 | 2/2002 | Cooperstone et al. |
| 2002/0026328 A1 | 2/2002 | Westerkamp et al. |
| 2002/0038228 A1 | 3/2002 | Waldorf |
| 2002/0040312 A1 | 4/2002 | Dhar et al. |
| 2002/0046036 A1 | 4/2002 | Kobayashi |
| 2002/0065701 A1 | 5/2002 | Kim et al. |
| 2002/0082996 A1 | 6/2002 | Scott et al. |
| 2002/0087336 A1 | 7/2002 | Hale et al. |
| 2002/0091574 A1 | 7/2002 | Lefebvre et al. |
| 2002/0091602 A1 * | 7/2002 | Stern et al. ............ 705/35 |
| 2002/0099561 A1 | 7/2002 | Wilkins et al. |
| 2002/0107764 A1 | 8/2002 | McCoy |
| 2002/0111888 A1 | 8/2002 | Stanley et al. |
| 2002/0116308 A1 | 8/2002 | Cunningham |
| 2002/0123898 A1 | 9/2002 | Lemay et al. |
| 2002/0138322 A1 | 9/2002 | Umezawa et al. |
| 2002/0161615 A1 | 10/2002 | Yui et al. |
| 2003/0004767 A1 | 1/2003 | Ohsaki |
| 2003/0004770 A1 | 1/2003 | Miller et al. |
| 2003/0009365 A1 | 1/2003 | Tynan et al. |
| 2003/0033184 A1 | 2/2003 | Benbassat et al. |
| 2003/0036912 A1 | 2/2003 | Sobotta et al. |
| 2003/0036934 A1 | 2/2003 | Ouchi |
| 2003/0041033 A1 | 2/2003 | Kaplan |
| 2003/0046134 A1 | 3/2003 | Frolick et al. |
| 2003/0050800 A1 | 3/2003 | Brandt et al. |
| 2003/0069777 A1 | 4/2003 | Or-Bach |
| 2003/0069831 A1 | 4/2003 | Le et al. |
| 2003/0083910 A1 | 5/2003 | Sayal et al. |
| 2003/0093458 A1 | 5/2003 | Poindexter et al. |
| 2003/0097319 A1 | 5/2003 | Moldoven et al. |
| 2003/0101111 A1 * | 5/2003 | Dang et al. ............ 705/31 |
| 2003/0105687 A1 | 6/2003 | Bross et al. |
| 2003/0126003 A1 | 7/2003 | vom Scheidt et al. |
| 2003/0144930 A1 | 7/2003 | Kulkarni et al. |
| 2003/0154113 A1 | 8/2003 | Chen et al. |
| 2003/0154115 A1 | 8/2003 | Lahey et al. |
| 2003/0171961 A1 | 9/2003 | Hosali et al. |
| 2003/0182212 A1 | 9/2003 | Moscone et al. |
| 2003/0191674 A1 | 10/2003 | Hale et al. |
| 2003/0195780 A1 | 10/2003 | Arora et al. |
| 2004/0103152 A1 | 5/2004 | Ludwig et al. |
| 2004/0107255 A1 | 6/2004 | Ludwig et al. |
| 2004/0183896 A1 | 9/2004 | Takamine et al. |
| 2004/0216057 A1 | 10/2004 | Wyle et al. |
| 2004/0225581 A1 | 11/2004 | Wyle et al. |
| 2004/0243626 A1 | 12/2004 | Wyle et al. |
| 2004/0267871 A1 | 12/2004 | Pratley et al. |

FOREIGN PATENT DOCUMENTS

| | | |
|---|---|---|
| JP | 10326314 | 12/1998 |
| JP | 2002/132980 | 5/2002 |
| JP | 2002/2149979 | 5/2002 |
| WO | WO 01/35678 A2 | 5/2001 |

OTHER PUBLICATIONS

Outsourcing Solution, Apr. 2003, CPA Wealth Provider.

Citrix Independent Computing Architecture, Nov. 23, 2002, Citrix Systems, Inc; Retrieved from the Internet at http://www.citrix.com/press/corpinfo/ica.asp.

L. Gary Boomer, The Bombay Connection, Sep. 27, 2002, Boomer Consulting, Inc; Retrieved from the Internet at http://www.boomer.com/bulletin/article.asp?ArticleId=965-2--2-08-27-39213-83.

L. Gary Boomer, Document management—paper-less is more!, Accounting Today, Aug. 2002, Boomer's Blueprint.

Your Tax Preparation Partner, Sep. 19, 2002, SurePrep; Retrieved from the Internet at http://sureprep.com/index.html.

The Industry's Premier Tax Compliance System, CCH; Retrieved from the Internet at http://tax.cchgroup.com/Pfx/Products/Tax/default.

* cited by examiner

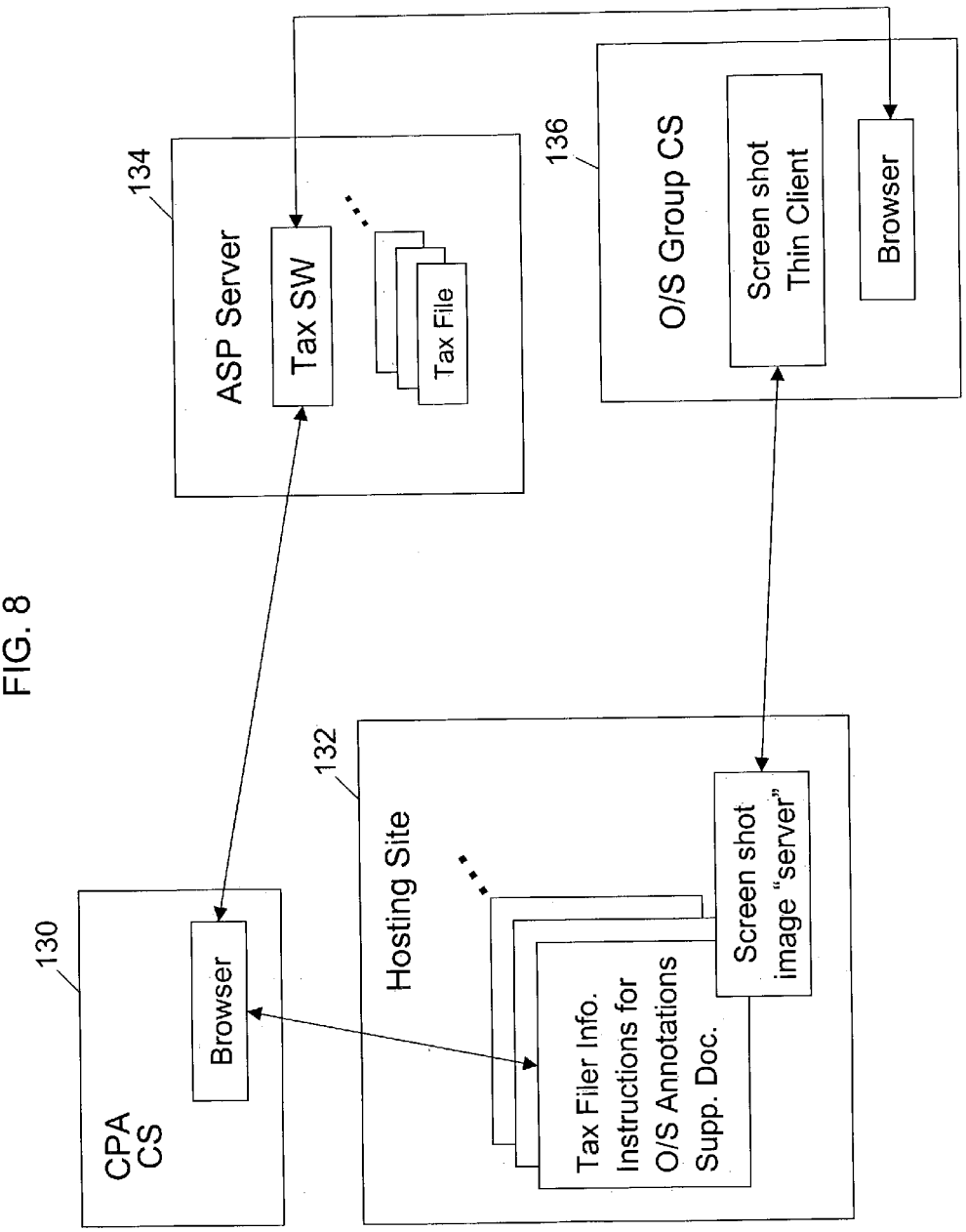

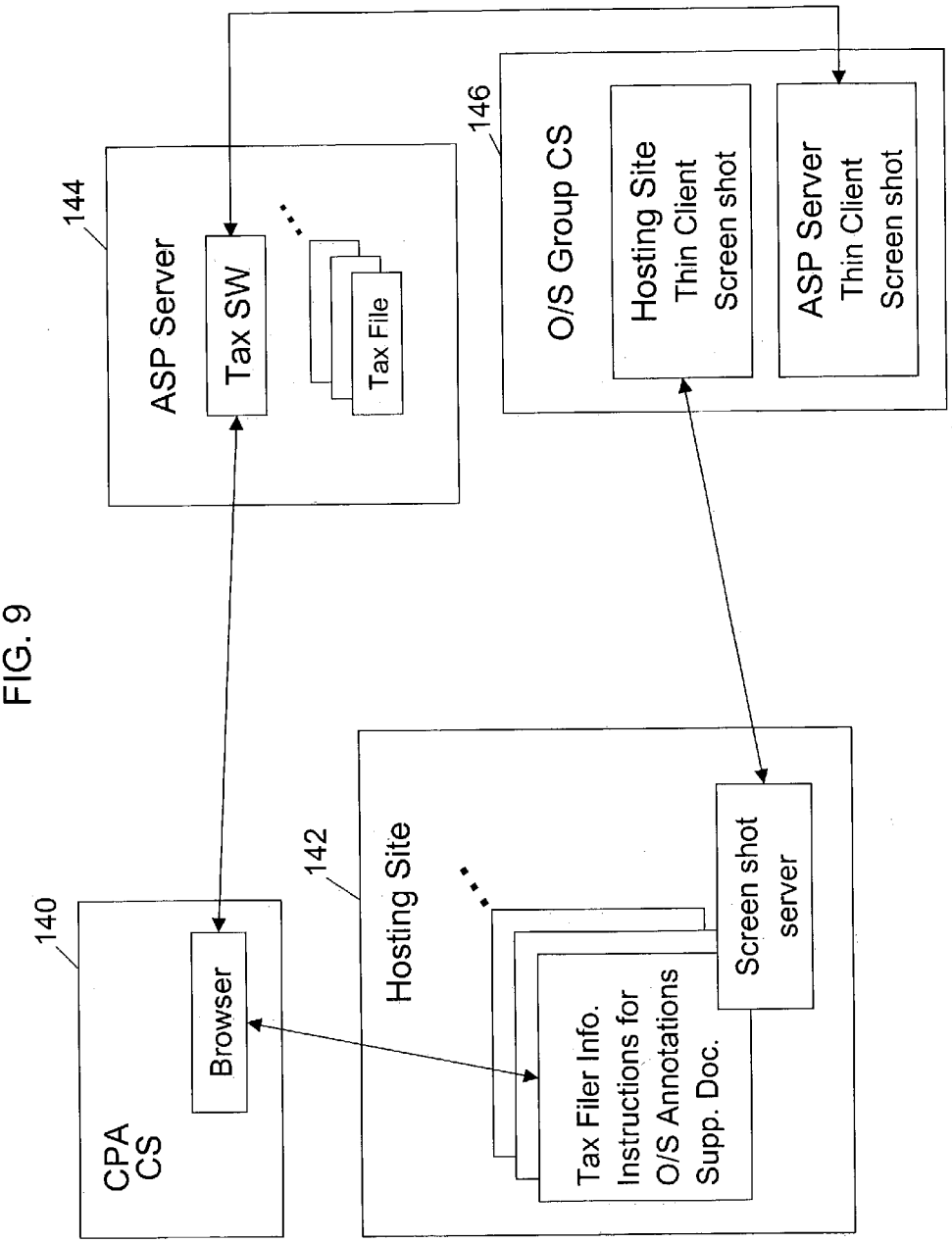

FIG. 10

| CPA Firm | | Tax SW T/R No. | |

| Client Name | | CPA Firm ID | |

| SSN | | Control No. | |

| CPA Firm Contact | | Email | |

Type of Return (tick relevant item)
- ○ W2
- ○ 1099-INT + Divident + Sale of Securities (up to 20 entries)
- ○ 1099-INT + Divident + Sale of Securities (more than 20 entries)
- ○ Business Income
- ○ K-1
- ○ Others Remarks Transmissions to India:

| Date | Done By | FTP File Name |
|---|---|---|
| | | |
| | | |
| | | |

Transmissions from India:

| Date | FTP Folder Name | Restored to Tax SW By: |
|---|---|---|
| | | |
| | | |
| | | |

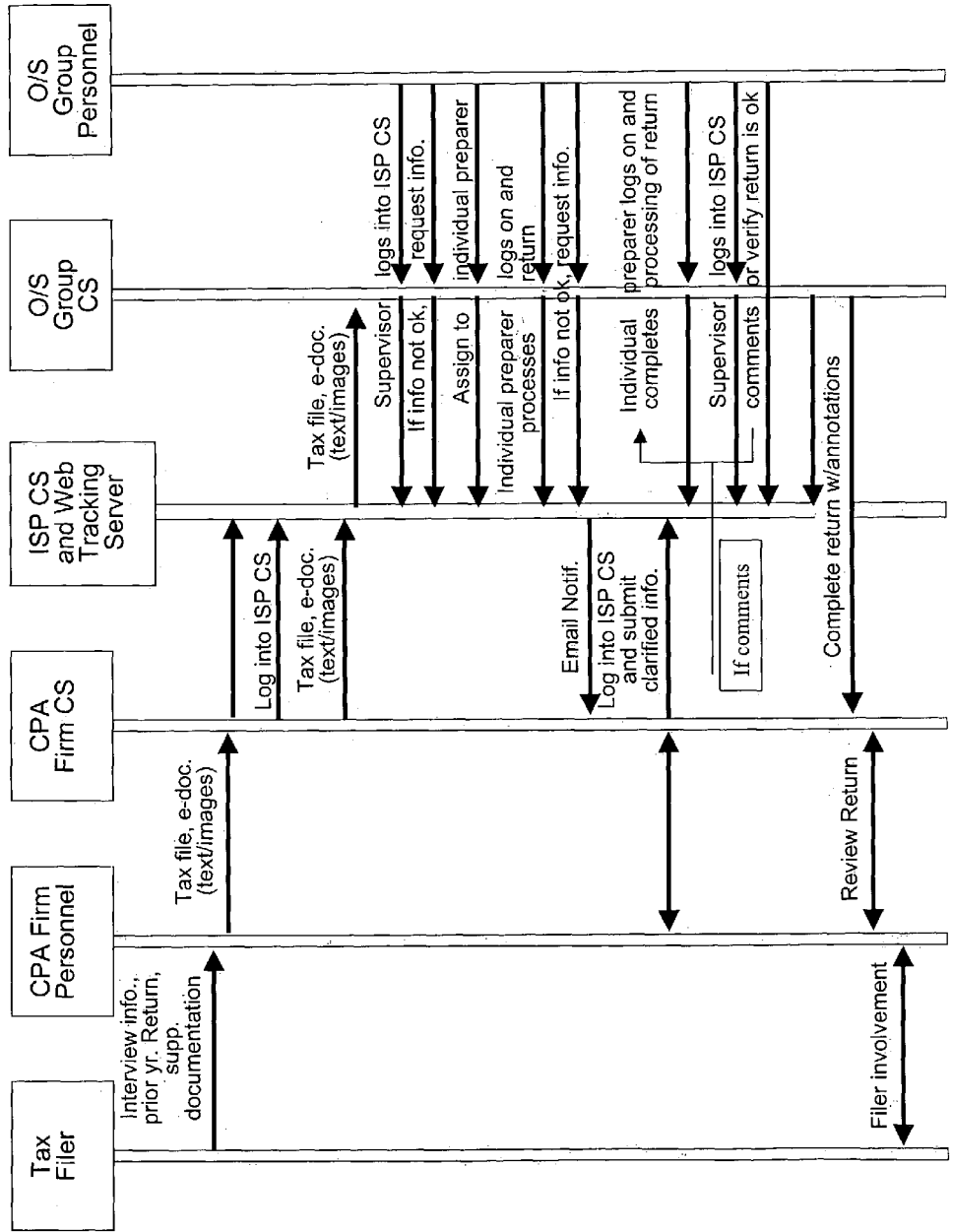

TAX RETURN OUTSOURCING AND SYSTEMS FOR PROTECTING DATA

RELATED APPLICATION DATA

Priority is hereby claimed to U.S. Provisional Application No. 60/428,998, filed Nov. 25, 2002, the content of which is hereby expressly incorporated by reference herein its entirety.

BACKGROUND OF THE INVENTION

1. Field of the Invention

The invention relates to systems and processes for facilitating the provision of tax return preparation services. In other aspects, the invention relates to systems and processes to facilitate the outsourcing of tax return preparation services and other types of financial services.

2. Description of Background Information

Many accounting firms wish to preserve and grow market share in the tax return preparation business and to maximize their profit margin for such services. To do this, they must accommodate their clients in such areas as cost, responsiveness, and quality, while minimizing their own costs to preserve the accounting firm's profit.

Non-accounting industries such as banking and insurance have been outsourcing various data processing tasks to India. Suggestions have been made to accounting firms to outsource tax return preparation services to India, to thereby reduce the per-return labor cost experienced by the accounting firm. There is a need for systems and methods to facilitate such outsourcing.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIGS. 5-9 show various embodiments of computer systems that may be employed in the systems of FIGS. 2-4;

FIG. 10 illustrates an exemplary tax outsourcing form;

FIGS. 11 and 12 are diagrams of processes by which various pieces of an outsourcing system may interact with each other during an outsourcing process.

DETAILED DESCRIPTION

Figure 1:
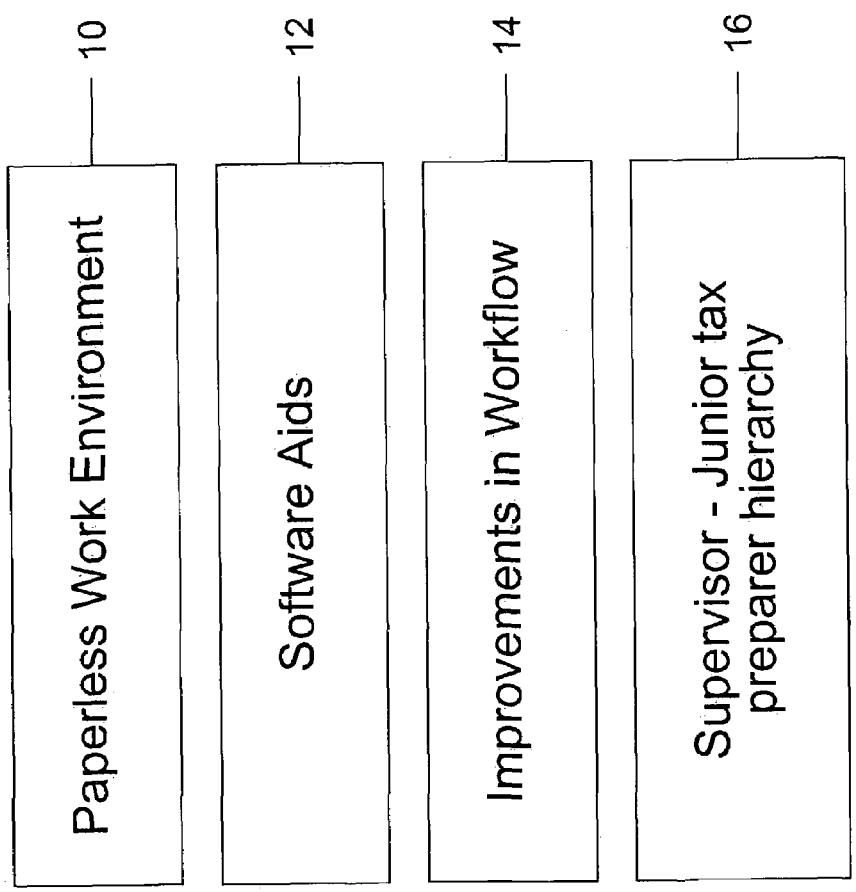
FIG. 1 is a block diagram showing background approaches to tax return preparation.

An object of the present invention is to provide systems, methods, and various tools that facilitate the outsourcing of tax return preparation services to a servicing group outside of the country. The invention may be directed to systems, apparatus, or features as described herein related to such an object.

According to one aspect of the invention, a system or method, or any one or more subparts thereof, is provided for tax outsourcing. For a given CPA firm, tax filer specific tax files and image files of corresponding reference materials are loaded onto a remotely accessible part of a server located in the United States. The server may be a server controlled by the CPA firm, and comprise tax software for use by the CPA firm. The server may be controlled by an ASP organization, and comprise tax software for use by plural independent CPA firms provided with access to that server. The CPA firm retains outsourced personnel to perform tax return preparation services on behalf of the CPA firm. The outsourcing personnel perform the tax return preparation services while being physically located outside the United States. In a specific embodiment, the outsourced personnel are located in India.

The retained personnel are provided with limited screen shot access to the remotely accessible server in the United States. Such access in one aspect of the invention is provided via the Internet. In accordance with another embodiment, such access is provided via a connection-oriented end point to end point high bandwidth transmission line. In one embodiment, the transmission line comprises a T1 line. The retained personnel prepare a tax return through a remote screen shot limited client located outside the United States connected to the server located in the United States. A status monitoring and reporting mechanism may be provided. In accordance with certain aspects of the invention, such a status monitoring and reporting mechanism may comprise a web tracking server accessible by the outsourcing personnel and by the CPA firm to be able to determine the status of the tax return preparation process at any given point throughout the process, through completion of the return and filing with the Internal Revenue Service.

The method for tax outsourcing may further comprise an intermediary service firm interacting with the retained outsourcing personnel through the use of a servicing computer system, and interacting with plural CPA firms through use of the servicing computer system.

The CPA firm interviews the tax filer and obtains supporting documentation for that tax filer's tax return. The supporting documentation may comprise, for example, the last season tax return as filed, receipts and summary information regarding finances, a W-2 form, 1099 forms, and so on. The CPA firm or the intermediary service firm makes sure that a tax file is set up which is compatible with a given tax software package (e.g., ProSystem fx), and renders each of these supporting documents readable by a computer, i.e., electronic. In the illustrated embodiment, each of the supporting documents is scanned into an image file such as a TIFF or PDF file.

The outsourcing personnel are only given access to the tax file and supporting documentation via an outsourcing computer system. The outsourcing computer system comprises terminals. Each person within the outsourcing group is provided access to an outsourcing group computer system terminal within a secure area, and that area does not allow the outsourcing personnel to have access to any paper or writing materials for marking notes and information on the paper. In addition, no other types of storage devices can be carried in or out of the secure area by the outsourcing personnel.

The terminals only provide image information concerning the tax file and supporting documentation pertaining to a given tax return being worked on by that outsourcing person. No detachable memory devices (e.g. floppy discs or CD-ROMs) can be used to locally store data and carry that data outside of the secure area. The terminals of the outsourcing group computer system provide thin client screen shot images and the user interface of the tax processing software. The processing is performed at the hosting site which is located in the United States, and is controlled either by the CPA firm or by the intermediary services firm. Alternatively, or in addition, the tax software and the tax file may be on an ASP (Application Service Provider) web site which is accessible only through limited screen shot image access (e.g., using PC anywhere or Citrix independent computing architecture technology). In addition, any data pertaining to the processing or the information being processed is retained on the hosting site, and such information is not accessible at the outsourcing group computer system or at any of its terminals. The only thing that is accessible is the screen shots of the user interface.

Figure 3:
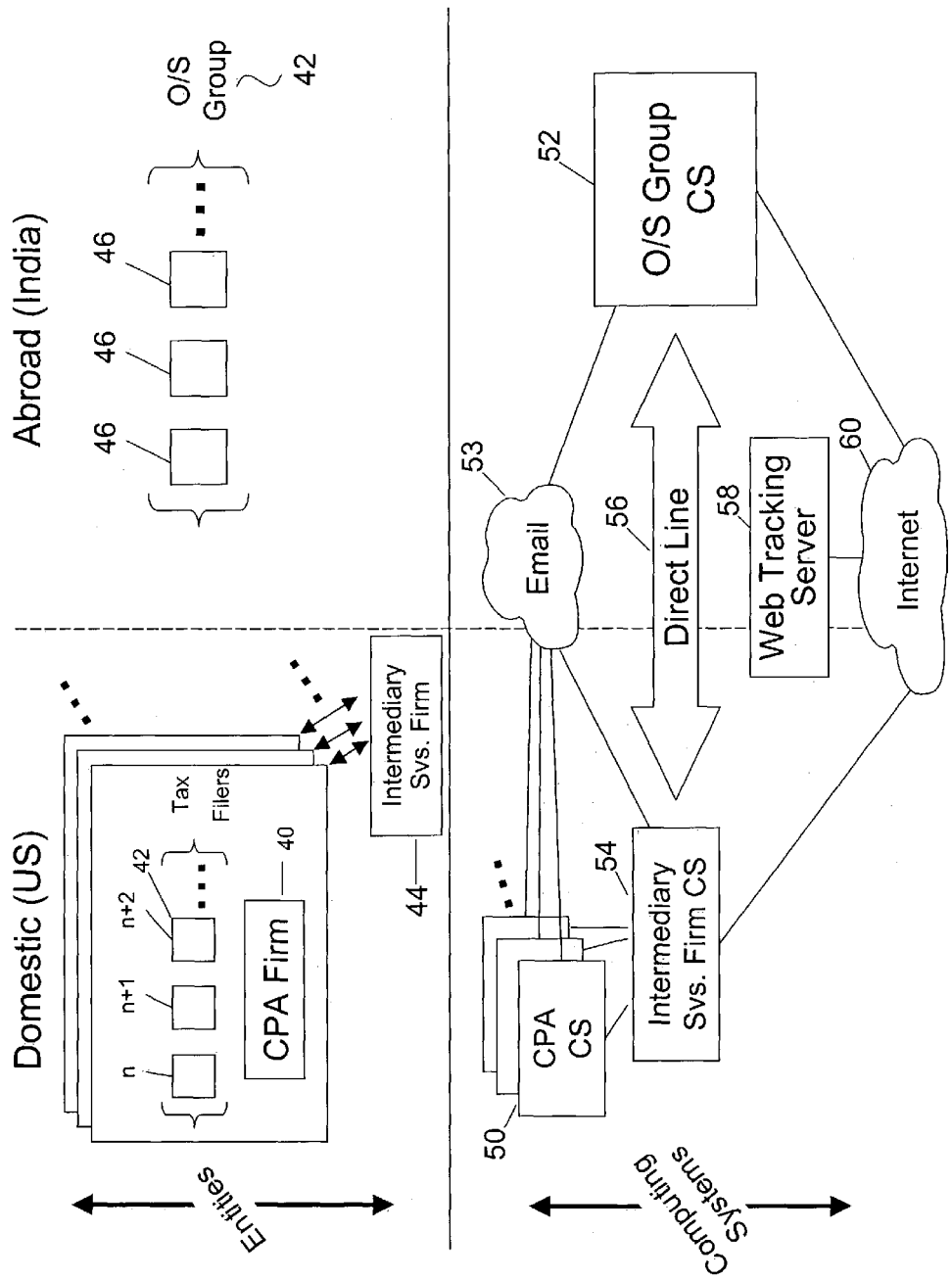
Figure 4:
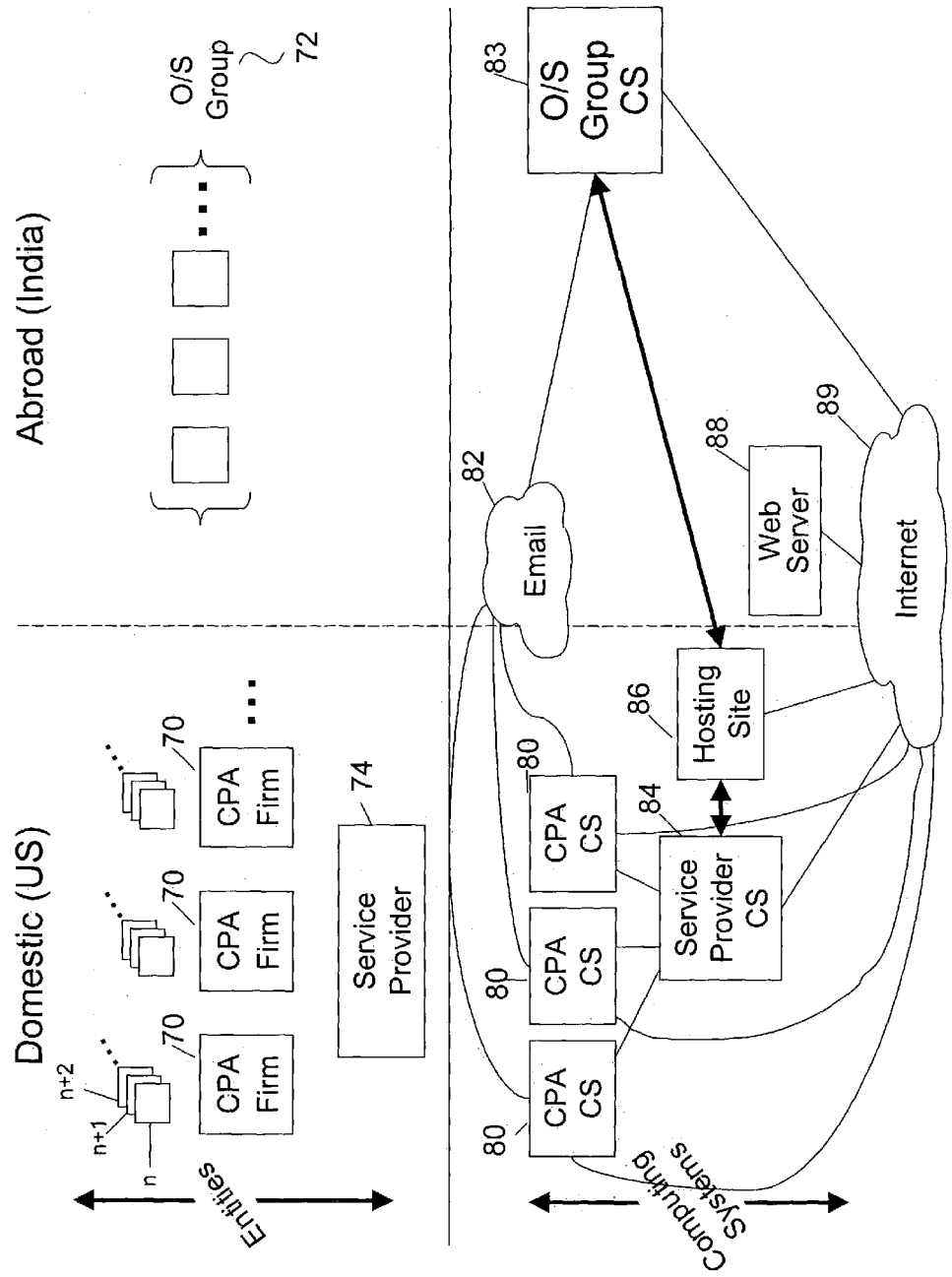

Outsourcing to an outsourcing group abroad with an intermediary services firm computer system and an outsourcing group computer system, for example, as shown in FIGS. 3 and 4, can be used in combination with a mixed outsourcing process. Such a mixed outsourcing process can involve the use of tax return outsourcing during the United States tax season. During an initial stage of the United States tax season, lowerend (smaller priced tax return services for individual tax filers) can be outsourced to the outsourcing group, allowing the United States personnel to work on higher-end (i.e. higher priced tax returns and other CPA services for corporations and businesses) at that early stage of the United States season, thus allowing the higher-rate US personnel to put priority attention to the higher-margin, higher rate services required by corporations and businesses. Personnel and resources can be managed throughout the year, for example, by switching to accounting firms in Australia at a later time period during the same year, providing Australia tax return preparation services utilizing the same personnel of the same outsourcing group and utilizing the same intermediary services firm computer system and outsourcing group computer system. Using the systems as shown in FIG. 3 or FIG. 4, alternatively or in addition, bookkeeping outsourcing can be performed on behalf of clients of the CPA firms in the United States and Australia, or in one or more other countries. Those services can be spread out through other times of the year, thus allowing more steady utilization of the personnel in the outsourcing group.

In accordance with another aspect of the invention, a tax outsourcing method may be utilized by a given CPA firm. The given CPA firm may load tax filer—specific tax files and image files of corresponding reference materials onto a remotely accessible part of a server located in the United States. That server may be configured so that it provides limited screen shot access to a remote client working outside the United States. The server may be controlled by the CPA firm and may comprise tax software for use by the CPA firm. The server may be controlled by an ASP (Application Service Provider) organization and may comprise tax software for use by plural CPA firms provided with access to that server.

A CPA firm may retain for use by the CPA firm, designated outsourcing individuals, such personnel being located outside the United States (in India in the illustrated embodiment) while performing services on behalf of the CPA firm. The retained personnel are provided with limited screen shot access to the server via, for example, the Internet or via a connection-oriented high bandwidth transmission line (e.g., T1). The retained outsourcing personnel are instructed to prepare assigned tax returns through a remote client located outside the United States (in India in the illustrated embodiment) connected to the server, which provides limited screen shot access to the tax software, the tax filer specific tax files, and to the corresponding image files. The work time of the outsourcing personnel is monitored, and the personnel are instructed to perform other related and unrelated tasks throughout a given period (year, tax season or any other designated time period), when the retained personnel are being underutilized.

FIG. 1 is a background diagram showing certain tools used to improve the efficiency and profitability of tax return preparation services. Block 10 refers to paperless work environment technologies and processes. Block 12 notes the use of software aids to help with the tax return preparation process. Block 14 shows that improvements in workflow can have an impact on the efficiency of tax return preparation services. Block 16 shows the importance of workflow processes involving supervisor and junior tax preparers. A hierarchy involving lower billing rate junior tax preparers, which can be supervised by more experience higher billing rates supervisors at the appropriate times, can result in high quality tax returns performed at a low cost.

Figure 2:
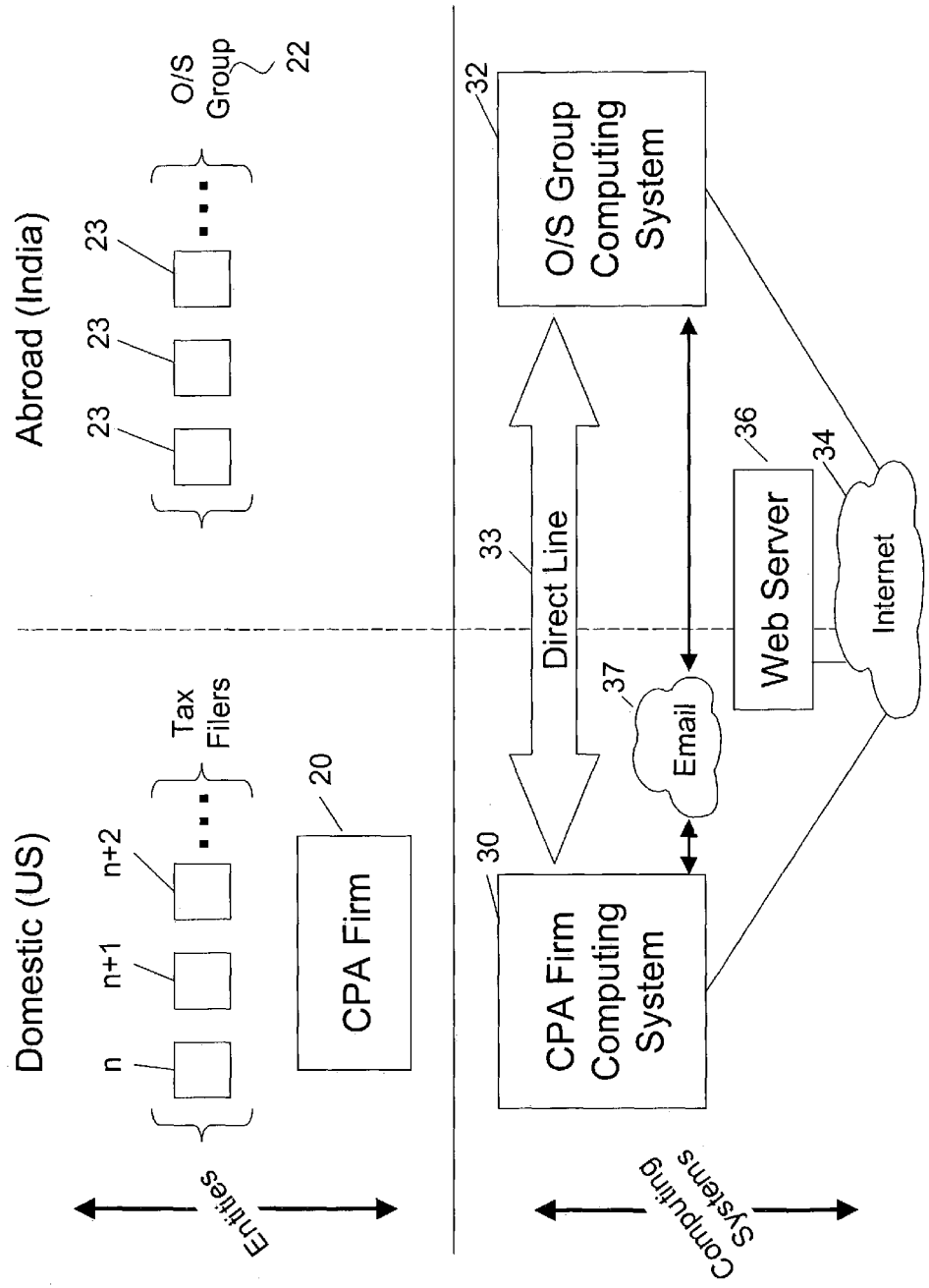
FIGS. 2-4 are schematic diagrams of financial services outsourcing systems.

FIG. 2 is a block diagram showing a tax return outsourcing process and system. The legal entities are shown in the top half of the diagram, while the corresponding computing systems are shown in the bottom half of the diagram. Tax filers including tax filers n, tax filer n+1 and tax filer n+2, etc., employ a given CPA firm 20 to prepare individual tax returns for the respective tax filers. CPA firm 20 delegates the initial tax return preparation services to an outsourcing group 22 abroad (in India in the illustrated embodiment). Outsourcing group 22 comprises a plurality of individual tax preparing personnel 23.

CPA firm 20 utilizes a CPA firm computing system 30. Outsourcing group 22 utilizes an outsourcing group computing system 32. CPA firm computing system 30 has a direct line connection 30 to outsourcing group computing system 32 via, for example, a connection-oriented end point to end point high bandwidth transmission line (e.g. a leased T1). The two computing systems shown at the bottom of FIG. 2 may also communicate via email 37, and also have Internet access 34 which provides them access to a web server 36. Web server 36 may, in the illustrated embodiment, be controlled by CPA firm 20, or by outsourcing group 22. Web server 36 provides web tracking information. For each significant event of the outsourced tax preparation process, an update is provided to web server 36 of the status of the tax return preparation process for a given tax return for a given tax filer. Accordingly, the CPA firm or the outsourcing group may, through their respective computing systems, through Internet access, access the web server and determine the status of the tax return preparation at any given point.

FIG. 2 has one CPA firm. That firm represents its own tax filers (customers). The CPA firm deals directly with the outsourcing group. Data needed for tax preparation filing is sent back and forth between the CPA firm computing system and the outsourcing group computing system via, for example, FTP (file transfer protocol) technology.

FIG. 3 shows another embodiment of a tax return outsourcing process and system. Legal entities are shown in the upper half of this diagram, and computing systems corresponding those legal entities are show in the bottom half of this diagram.

In this diagram, CPA firms 40 outsource tax return preparation services through the interaction with an intermediary service firm 44. The intermediary service firm 44 deals directly with each of the CPA firms 40, and deals directly with the outsourcing group 42 abroad and its personnel 46 (India in the illustrated embodiment). Each CPA firm 40 represents its own set of tax filers n, n+1, n+2, etc. Each CPA firm 40 has its own computer system 50. The intermediary service firm 44 has its own computer system 54. The outsourcing group 42 has its computer system 52. The connection between the intermediary service firm computer system 54 and the outsourcing group computer system 52 may be via a direct line connection 56 which may be of a type that is shown and described above with respect to FIG. 2. In addition, a web tracking server 58 as described above may be provided, which may be accessed via the Internet 60. The CPA firms 40, the intermediary service firm 44, and the outsourcing group 42, may communicate via email 53 for purposes of providing status information, asking questions and providing responses to questions throughout the process of preparing a given tax return.

FIG. 4 is another diagram of a tax return outsourcing process and system. Legal entities are shown in the upper half to this diagram; computing systems corresponding to those entities are shown on the bottom half of this diagram. The general process of performing outsourcing services through a service provider may be as described as previously. A service provider is shown 74 which interacts with CPA firms 70, each CPA firm having its own tax filer customers. An outsourcing group 72, dealt with via the service provider 74, is located abroad, (India in the illustrated embodiment). Each CPA firm 70 has a computer system 80. The service provider 74 has a computer system 84. The outsourcing group 72 has a computer system 83. All data, tax files and supporting documentation is retained in one or more hosting sites 86 in the United States. All of that information is accessible only through a screen shot image thin client on the outsourcing group computer system 83. A web server 88 is provided web tracking.

Figure 5:
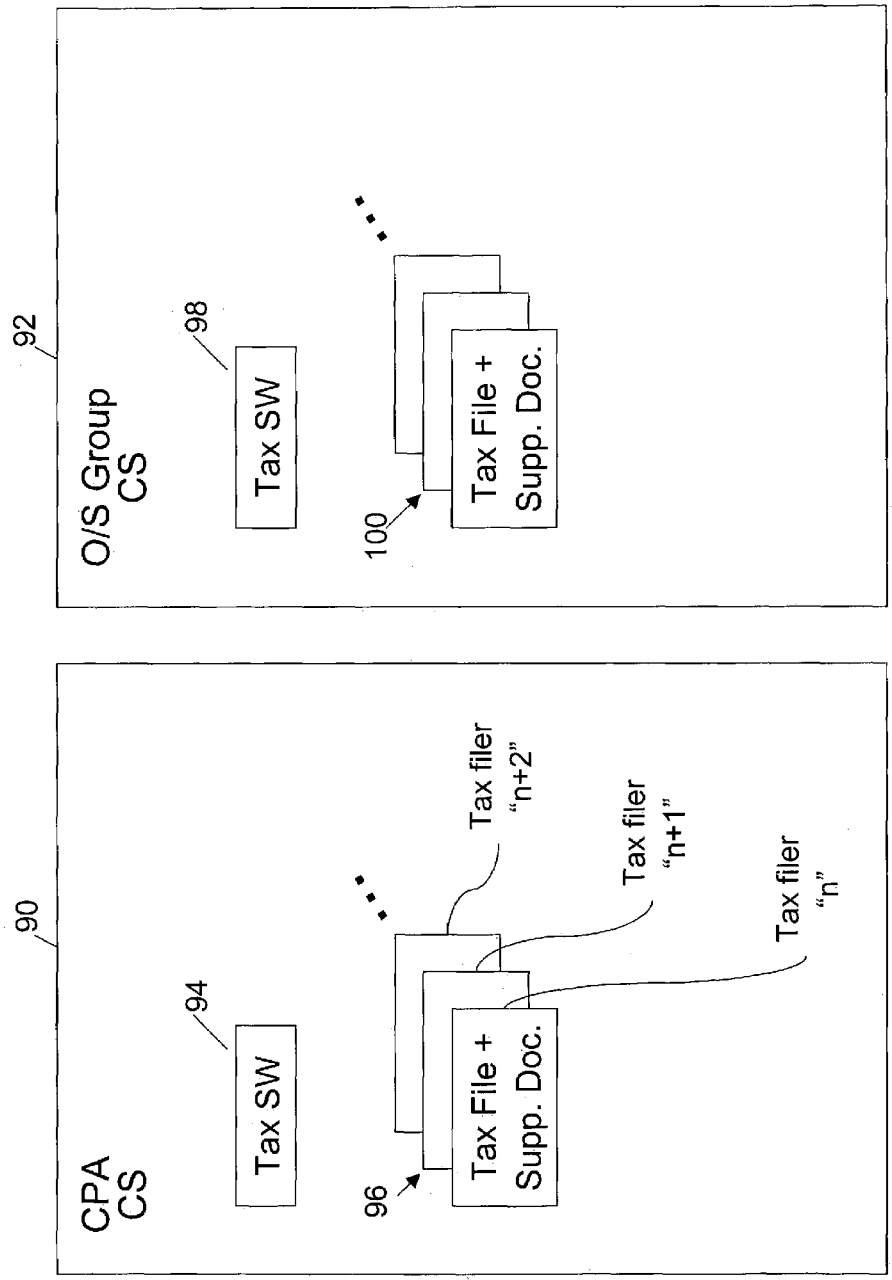

FIG. 5 shows a CPA Computer System (CS) 90 and an outsourcing group Computer System (CS) 92, with certain software and files included within those computer systems. CPA CS comprises tax software 94, and a tax file and supporting documentation 96 in electronic form (in the illustrated embodiment, scanned image files TIFF or PDF). A tax file and supporting documentation are provided for each tax filer. Corresponding tax software 98 and tax files and supporting documentation 100 are provided at the outsourcing group computer system 92. Tax software is provided at each processing point end. That is, tax software is provided at the computer system of the CPA and is also provided on the computer system on the outsourcing group. In addition, data and files for that software is provided at each processing point end. Data may be exchanged between these points (i.e. between the CPA firm computer system and the outsourcing computer system). Such a data exchange may be performed using, for example, FTP. The block diagram of FIG. 5 corresponds, for example, to the processing systems shown in FIGS. 2 and 3.

Figure 6:
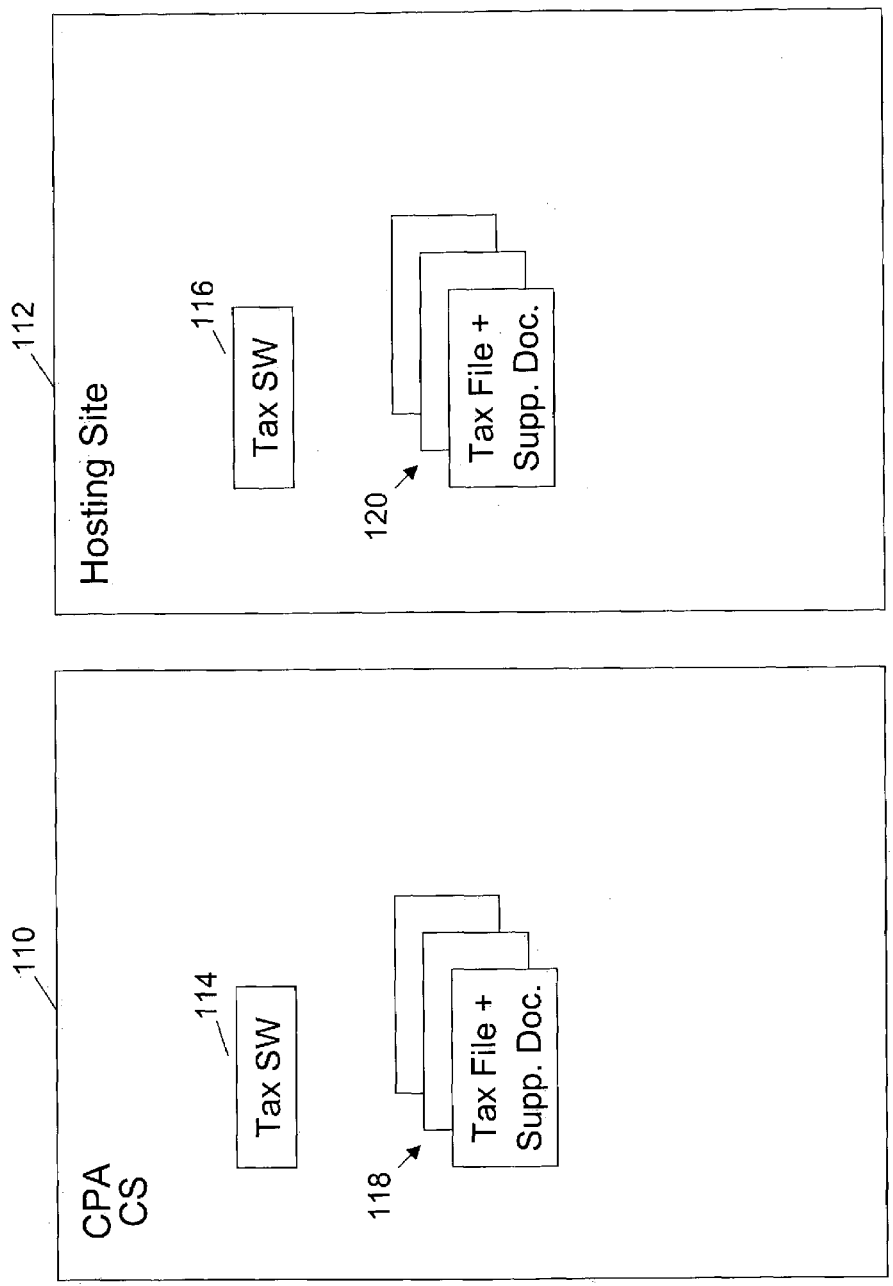

FIG. 6 shows a diagram of the CPA computer system 110 and a hosting site 112, illustrating the software and data provided on each of those computer systems. The embodiment of FIG. 6 may be performed in connection with the outsourcing process and systems in FIG. 4. Tax software 114 is provided on the CPA computer system 110 and tax software 116 provided on the hosting site, for use by the outsourcing group via a screen shot image limited thin client (e.g. using Citrix independent computing architecture technology). Corresponding tax files and supporting documentation 118, and 120 also reside on the respective computer systems. Data may be exchanged between the CPA computer system and the hosting site. Such a data exchange may be performed, for example, using FTP technology. The data can be exchanged through a direct connection, for example, a leased T1 line with a dedicated end point to end point access to and from CPA computer systems and the hosting site computer system and each end.

The data (comprising the tax file or any portion of the supporting documentation) is not sent to the outsourcing group. Only screen shot images are provided to the outsourcing group computer system. In the reverse direction from the outsourcing group computer system to the hosting site, only key strokes and user interface information is provided.

Figure 7:
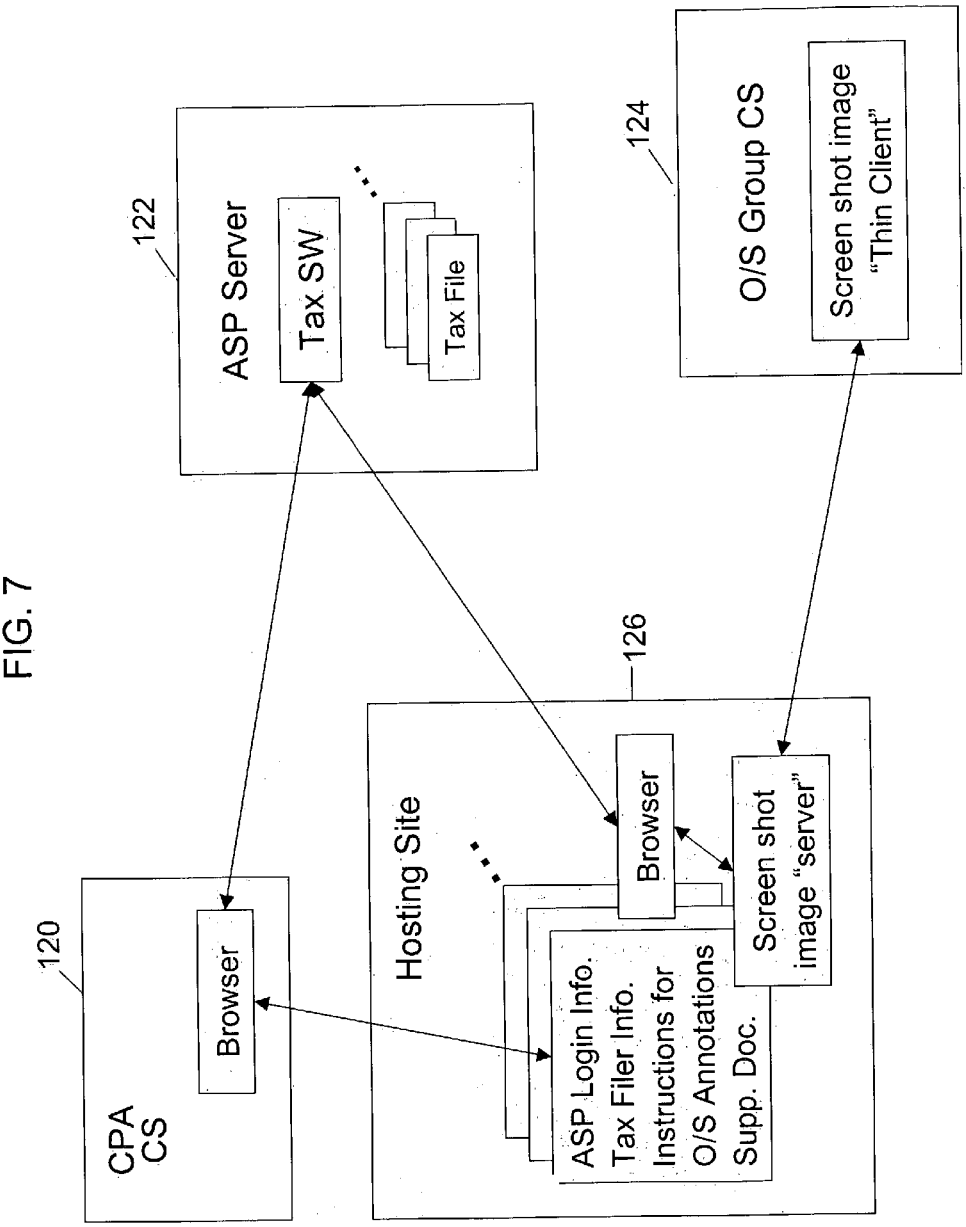

FIG. 7 is a block diagram of some of the computer systems and the software and data carried by each of those computer systems. The systems illustrated include a CPACS 120 an ASP server 122, an outsourcing CS 124, and a hosting site 126. The embodiment of FIG. 7 may be used in connection with the tax return outsourcing process and system shown in FIG. 4. In this diagram, the tax software and the tax files are provided on an ASP (application service provider) server. The tax software and tax files are not provided elsewhere. The tax software and tax files may be provided elsewhere, under limited circumstances. However, the embodiment show in FIG. 7 does not specifically show such a case. The outsourcing group is given access to the ASP service via a hosting site 126. The outsourcing group computer system 124 is provided access to the hosting site 126 through a screen shot image thin client which interacts with the screen shot image server provided on the hosting site. The screen shot image server on the hosting site interacts through a browser with the ASP server to provide access to the tax software and tax files on the ASP server. The hosting site has a set of information for each tax filer. The set of information for each tax filer is identified in accordance with the CPA firm to which that tax filer is associated. Each such set of information can include, for example, an ASP log in information, tax filer information, instructions for the outsourcer for that tax return for that tax filer, annotations provided by the person within the outsourcing group working on the return, and the supporting documentation for the given return being worked on. The CPA computer system is provided access to each such set of information residing on the hosting site through the use of a browser.

FIG. 8 is a block diagram showing the CPA computer system 130, a hosting site 132, an ASP server 134 and outsourcing group computer system 136. The types of software and data provided on each of these computer systems is shown in accordance with another embodiment which may be utilized in connection with the tax return outsourcing process and system show in FIG. 4. Here, the tax software and tax files are provided at the ASP server 134. The outsourcing group is given direct access to tax file and tax software via a browser access to the ASP server 134. The outsourcing group computer system 136 is provided access to the hosting site 132 through the use of screen shot image server and thin client, and in a manner similar to that illustrated in FIG. 7. For each tax filer, a set of information is provided on the hosting site. Such information may comprise tax filer information, instructions for the outsourcing group for that given tax return, annotations provided by the person working on the return at the outsourcing group, and supporting documentation associated with the tax file being worked on. The CPA computer system is provided access to each such set of information via its own browser.

FIG. 9 shows a CPA computer system 140, hosting site 142, an ASP server 144, and an outsourcing group computer system 146. The tax software and tax files are provided on the ASP server 144. The outsourcing group is given direct access to the tax file and tax software via a screen shot image client. Otherwise, the features shown in FIG. 9 correspond substantially to those shown on FIG. 8.

Figure 11:
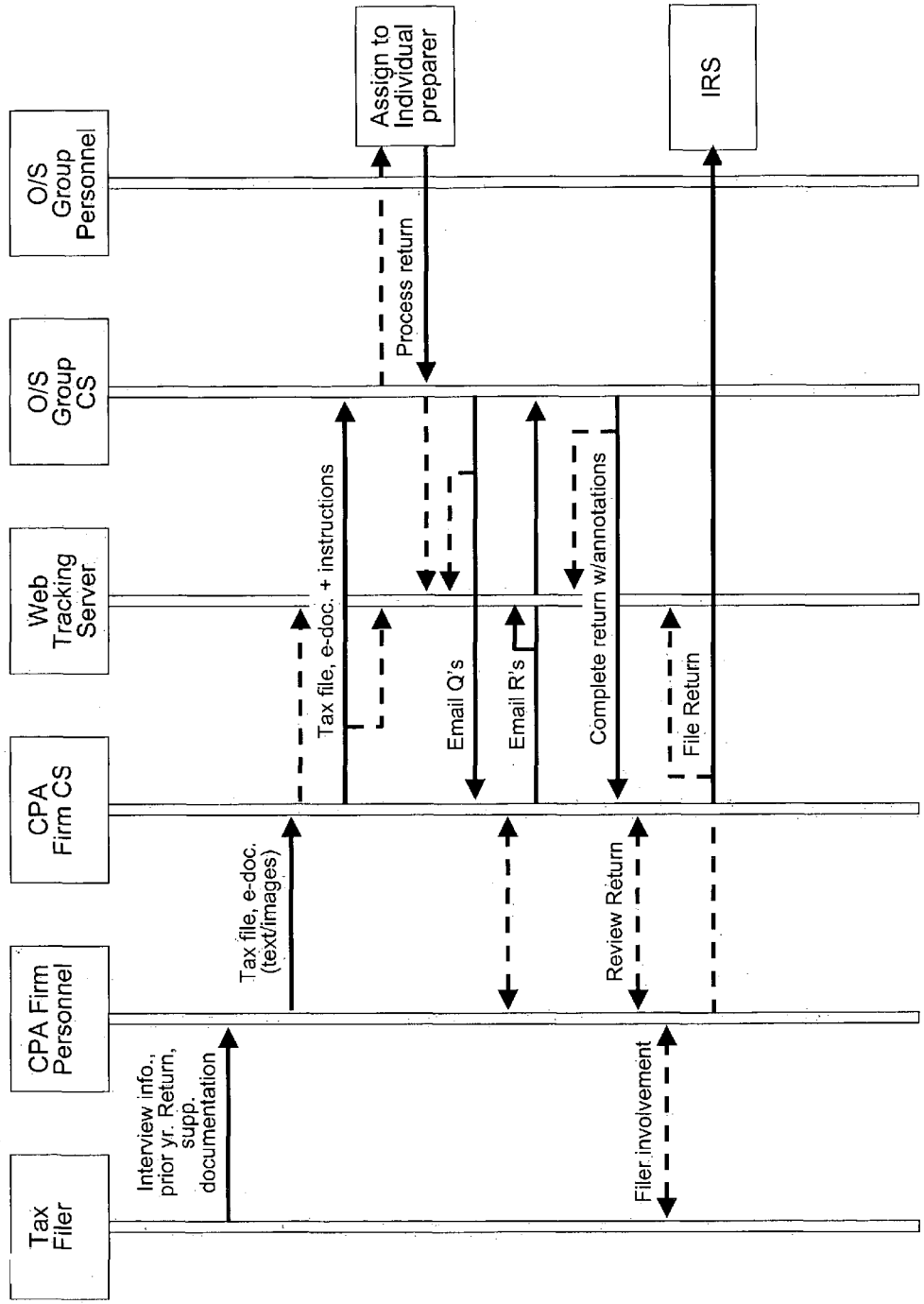

FIG. 10 is a form, which may be either electronic or on paper form, that may be used with, for example, tax return outsourcing process and systems shown in FIG. 2 and further illustrated in the process diagram of FIG. 11.

Toward the top of the form, information may be provided regarding the CPA firm, the client name, the social security number of the tax filer, and the firm contact at the CPA firm which is the contact that should be worked with by the outsourcing group personnel working on a given tax return. The tax software tax return number is provided which uniquely identifies the tax return. A CPA firm identification may be also provided for uniquely identifying the CPA firm. The control number may also be provided for purposes of allowing identification of this particular form. The email of the CPA firm contact is provided as well. A number of items indicative of the type of return to be worked on are provided in the middle of the form. The relevant item to be worked on can be marked on the form. A log is provided for keeping track of transmissions to India and transmissions from India. Each transmission is logged by date, who performed the transmission, and the FTP file name. The transmissions from India are kept track of by date, the FTP folder name, and the person who restored the information to the tax software.

FIG. 11 shows a process which can be performed, for example, by the tax return outsourcing process system shown in FIG. 2. In an initial part of the process, a tax filer is interviewed and information is obtained from the tax filer and provided to the CPA firm personnel. Such information can include the prior year return and supporting documentation. The CPA firm personnel then provides the tax file and electronic versions of the supporting documentation to the CPA firm computer system. CPA firm personnel may do this by scanning the supporting documentation and producing image files which can be stored on the CPA firm computer system. When this is done, an event is automatically generated for sending to the web tracking server indicating that the tax return preparation process is at this stage (i.e. tax file and e-doc (supporting documentation) information ready and stored on the CPA firm computer system).

Then, the tax file, e-doc, and instructions for the outsourcing group are sent from the CPA firm computer system to the outsourcing group computer system. This can be performed by a direct exchange of information over the direct line shown in FIG. 2. An event communication is then concurrently sent to the web tracking server indicating that the process is at this stage. The outsourcing group will then provide a notification so that the outsourcing group personnel can assign the return to an individual preparer.

In the illustrated embodiment, this assignment to an individual preparer occurs at a time in the morning which corresponds to the evening time in the United States. When it is evening in the United States, it is the following morning in India. The individual preparer in India is assigned to the tax return and starts working on it early that day for completion of the return by that evening, India time. Accordingly, the return will be ready and complete by the beginning (morning US time) of the day following when the instructions, tax file and e-doc were sent to the outsourcing group.

When the return is processed by the assigned individual preparer in India, this is done through the outsourcing group computer system. When this happens another event indication is sent to the web tracking server.

Then, if necessary, the individual preparer, using the outsourcing group computer system, will email questions to be answered by the CPA firm personnel (specifically the contact person identified in the form). The CPA firm personnel, using the CPA firm computer system, will then prepare a response to the questions and email them back to the outsourcing group computer system. When this happens, another event indication is provided to the web tracking server, indicating that the overall tax preparation process for this return is at a stage where answers have been provided to the outsourcing group computer system in response to the questions of the individual preparer in India.

The individual preparer then, using the outsourcing group computer system, completes the return and provides annotations in the tax file. The tax software, if it is ProSystem fx, comprises a footnote function which will allow a footnote to be provided at each line throughout the tax return. Within any given potential footnote, the individual preparer may provide either written notes or an image document or file to be referred to for purposes of annotations so that the reviewer at the CPA firm can understand the rationale and basis for the information provided in a given part of the tax return. The complete return and annotations are then sent from the outsourcing group computer system to the CPA firm computer system. The CPA firm personnel will review the return. Any necessary filer involvement will be then handled. For example, the filer may review the return and sign it. The return is then filed either manually or electronically with the IRS. When this happens, another event indication may be provided to the web tracking server.

FIG. 12 shows a process which can be performed, for example, by the tax return outsourcing system (or financial services outsourcing system) shown in FIG. 3 et seq. In an initial part of the process, a tax filer is interviewed and information is obtained from the tax filer and provided to the CPA firm personnel. Such information can include the prior year return and supporting documentation. The CPA firm personnel then provides the tax file and electronic versions of the supporting documentation to the CPA firm computer system. The CPA firm personnel may do this by scanning the supporting documentation and producing image files which can be stored on the CPA firm computer system. The CPA firm then accesses the intermediary service provider (ISP) computer system and web tracking server through use of the CPA firm computer system, and transfers the tax file and electronic versions of the supporting documentation to the ISP computer system. The supervisor of the outsourcing group personnel, through use of the outsourcing group computer system, will log into the ISP computer system. If the supervisor determines that the information is not suitable in one way or another, the supervisor may request information by logging requests for such information or questions on line through the ISP computer system.

Thereafter, the supervisor will assign the tax return to an individual preparer by identifying such assignment on the ISP computer system.

At that point, the individual preparer may log on to the ISP computer system and process the return. If the return is not acceptable or complete for one reason or another, or if the information being used by the individual preparer is incomplete or requires clarification, the individual preparer may request information or provide specific questions on the ISP computer system for retrieval and review by CPA firm personnel. When such requested information has been logged with the ISP computer system, an email notification is automatically generated and forwarded to the CPA firm computer system to alert the appropriate CPA firm personnel. The appropriate CPA personnel, upon receiving the alert email notification, will log into the ISP computer system and submit the clarified, information into the ISP computer system for retrieval by the outsourcing group personnel. At that point, the individual preparer logs onto the ISP computer system and completes the processing of the return, considering the responses provided by the CPA firm personnel. Once the return is processed, a supervisor from the outsourcing group personnel logs into the ISP computer system and reviews the return. If the supervisor has comments, the comments may be logged into the ISP computer system, and at which point the individual preparer will then log onto the ISP computer system and complete or revise processing of the return taking into account the supervisor comments.

If the supervisor does not have comments regarding the return, the supervisor may verify that the return is acceptable, by indicating such on the ISP computer system page.

At this point, the complete return is submitted to the ISP computer system, along with annotations. The CPA personnel may then access the return by accessing the ISP computer system and review the return. Thereafter, any tax filer involvement required in connection with the completion of the return may be carried out.

In tax preparation situations not involving an online system such as that described herein, tax returns may be received in January, February, and early March, while the returns are not started until the middle of March of a given tax year. A given tax filer may retain the accounting firm, and information concerning that tax filer may be logged into a system of the accounting firm, such as a file to be placed in a file cabinet. The preparer will, at some point, start preparation of the return. The preparer will pull the file, organize the file, and review the last year return. The preparer will input data, look for missing information, and generate a list of questions in writing. The questions will be sent to the responsible person within the accounting firm. The responsible person will attempt to contact the client by telephone to address the questions. Once the questions are addressed, the tax return is completed, and at which point the tax return is reviewed by a tax department or project manager.

With the systems, for example, of FIGS. 2-5, the preparation, question generation, communication with the tax filer, and the completion of the return may all be outsourced to outsourcing group personnel. The completed return is then reviewed by a tax department or project manager of the CPA firm which directly represents the tax filer. Such outsourcing can occur as soon as the return is received by the accounting firm, i.e., in January, February, or early March, and not at a late date such as the middle of March, which is the time at which some accounting firms may start processing certain returns.

The process shown in FIG. 12, described above, involves the use of an ISP computer system. In the illustrated embodiment, the ISP computer system comprises a web tracking server. Generally, outsourcing personnel logs into the outsourcing personnel access page of the web tracker, and accesses the information associated with a given tax return. The outsourcing personnel will then prepare the tax return. During that process, review notes may be posted to the web tracker. The ISP computer system will, then generate an email to the tax person responsible for clearing points raised with respect to a given tax return. The tax person then accesses the web tracker, views the questions posted, and posts answers to those questions on the web tracker. The tax person may have a different CPA firm access web page which it may view, providing the responsible tax person with access to the posted review notes. In addition to emailing the tax person responsible for clearing points, an email may also be sent to an administrative person within the CPA firm. The administrative person may log such question, or independently notify other personnel within the CPA firm of the questions.

The web tracker will keep and provide to parties accessing the web tracker certain status information concerning a given tax return. In this regard, each of the status events described above with respect to FIG. 11 may be tracked and revealed to parties accessing the web tracker in connection with a given tax return. Some of those events may be a specific date of completion of the tax return, which is posted to the web tracker, and which information can be accessed by the CPA firm or the outsourcing personnel through their respective computer systems.

What is claimed is:

1. A financial services outsourcing method for facilitating outsourcing of tax return preparation services for numerous clients on behalf of a direct service provider serving the numerous clients, the financial services being outsourced to a given outsourcing group, the clients comprising a first set of clients in a first country, having tax return filing obligations for the first country, and comprising a second set of clients in a second country having tax return filing obligations for the second country, the method comprising:

for the direct service provider, loading, onto a remotely accessible part of a host server, client specific financial files and corresponding reference materials, the host server providing access to a remote computer client of information concerning the client specific financial files and corresponding reference materials;

providing outsourced personnel with limited screen shot access to the host server connected through a remote limited access client located outside the first and second countries, wherein the direct service provider has control of the host server and the client specific financial files and corresponding reference materials pertaining to a given tax return loaded thereon;

preparing tax returns for the clients of the direct service provider by the outsourced personnel, the outsourced personnel located outside the first and second countries and utilizing the limited screen shot access of the client specific financial files and corresponding reference materials on the host server; and monitoring and reporting to the direct service provider a status of the tax return preparation during the tax return preparation performed by the outsourced personnel, wherein the direct service provider can obtain a status report in response to a status change occurring with the tax return preparation.

2. The method according to claim 1, wherein the tax return preparation services comprise individual tax return preparation services.

3. The method according to claim 1, wherein the tax returns are outsourced through an intermediary firm to the outsourced personnel.

4. The method according to claim 3, further comprising the intermediary firm interacting with the outsourced personnel through use of a servicing computer system, and interacting with plural direct service providers through use of the servicing computer system.

5. The method according to claim 3, wherein the direct service provider comprise an accounting firm.

6. The method according to claim 1, wherein the host server comprises a CITRIX server.

7. The method according to claim 1, wherein the host server comprises an ASP server running tax software for use by plural independent direct service providers provided with access to the ASP server.

8. The method according to claim 2, wherein the host server comprises an ASP server running tax software for use by plural independent direct service providers provided with access to the ASP server.

9. The method according to claim 1, wherein the corresponding reference materials comprise image files of physical reference materials.

10. The method according to claim 1, wherein the client specific financial files and corresponding reference materials comprise tax filer specific tax file and image files.

11. The method according to claim 10, further comprising loading onto the remotely accessible part of the host server tax preparation software.

12. The method according to claim 1, wherein the outsourced personnel prepare tax returns while located in India.

13. The method according to claim 1, further comprising the direct service provider interviewing a tax filer and obtaining supporting documentation for the tax filer's tax return.

14. The method according claim 13, wherein the direct service provider comprises an accounting firm.

15. The method according to claim 13, wherein the supporting documentation comprises last season tax return as filed, receipt, and summary information regarding finances of the tax filer.

16. The method according to claim 15, further comprising the direct service provider setting up a tax file compatible with a given tax software package, and rendering the supporting documentation electronic.

17. The method according to claim 16, wherein rendering the supporting documentation electronic comprises scanning supporting documents into image files.

* * * * *